(12) United States Patent
Tanno et al.

(10) Patent No.: US 11,161,256 B2
(45) Date of Patent: Nov. 2, 2021

(54) ROBOT GRAVITY BALANCER AND ROBOT

(71) Applicant: FANUC CORPORATION, Yamanashi (JP)

(72) Inventors: Yoshihiro Tanno, Yamanashi (JP); Toshinori Ohashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 54 days.

(21) Appl. No.: 16/353,245

(22) Filed: Mar. 14, 2019

(65) Prior Publication Data

US 2019/0321987 A1    Oct. 24, 2019

(30) Foreign Application Priority Data

Apr. 24, 2018 (JP) .............................. JP2018-082895

(51) Int. Cl.
*B25J 19/00* (2006.01)

(52) U.S. Cl.
CPC ................................ *B25J 19/0016* (2013.01)

(58) Field of Classification Search
CPC ...... B25J 19/0016; B25J 19/0008; F16F 1/00; F16F 1/12; F16F 15/06; F16F 9/3271; F16F 3/04
See application file for complete search history.

(56) References Cited

U.S. PATENT DOCUMENTS 2,995,327 A * 8/1961 Wood .................... F16L 3/2053
                                                      248/543
4,592,697 A * 6/1986 Tuda ........................ B25J 9/046
                                                      267/71
(Continued)

FOREIGN PATENT DOCUMENTS

CN         102990677 A       3/2013
CN         104890010 A       9/2015
(Continued)

OTHER PUBLICATIONS

Japanese Decision to Grant a Patent dated May 26, 2020, in connection with corresponding JP Application No. 2018-082895 (4 pgs., including machine-generated English translation).

(Continued)

*Primary Examiner* — Jake Cook
*Assistant Examiner* — Gregory Robert Weber
(74) *Attorney, Agent, or Firm* — Maier & Maier, PLLC

(57) ABSTRACT

A robot gravity balancer includes: a tubular housing whose both ends in the direction of a longitudinal axis are closed by end plates having through-holes; a movable member housed inside the housing so as to be movable in the direction of the longitudinal axis; a compression spring disposed between the movable member and the end plate; and an elongated rod that is capable of being passed through the through-holes of both the end plates, and that is disposed in a state of having one end detachably mounted on the movable member and the other end protruding to the outside of the housing, regardless of which of the through-holes the rod is passed through. The robot gravity balancer is disposed between a first member and a second member of a robot, the second member being provided so as to be swingable around a predetermined swing axis relative to the first member.

6 Claims, 7 Drawing Sheets

(56) References Cited

U.S. PATENT DOCUMENTS

| | | | |
|---|---|---|---|
| 5,402,690 A | 4/1995 | Sekiguchi et al. | |
| 6,848,333 B2* | 2/2005 | Lundstrom | B25J 19/0016 74/490.05 |
| 8,978,507 B2* | 3/2015 | Long | B25J 19/0016 74/490.01 |
| 9,221,182 B2* | 12/2015 | Broberg | B25J 19/0079 |
| 2001/0022112 A1 | 9/2001 | Bayer et al. | |
| 2002/0162414 A1 | 11/2002 | Lundstrom et al. | |
| 2012/0186379 A1 | 7/2012 | Miyamoto | |
| 2013/0061707 A1 | 3/2013 | Long | |
| 2016/0325441 A1 | 11/2016 | Harada | |

FOREIGN PATENT DOCUMENTS

| | | | | |
|---|---|---|---|---|
| CN | 105459156 A | 4/2016 | | |
| DE | 100 07 251 A1 | 8/2001 | | |
| DE | 699 11 095 T2 | 3/2004 | | |
| DE | 10 2010 005 102 B3 | 7/2011 | | |
| DE | 10 2010 005 103 A1 | 7/2011 | | |
| EP | 0947296 A2 * | 10/1999 | | B25J 19/0016 |
| EP | 3 090 842 A1 | 11/2016 | | |
| JP | H04-98590 U | 8/1992 | | |
| JP | H05-200690 A | 8/1993 | | |
| JP | H06-170780 A | 6/1994 | | |
| JP | H10-225891 A | 8/1998 | | |
| JP | H11-216697 A | 8/1999 | | |
| JP | 2001-225293 A | 8/2001 | | |
| JP | 2002-283274 A | 10/2002 | | |
| JP | 2002283274 A * | 10/2002 | | |
| JP | 4281195 B2 | 6/2009 | | |
| JP | 2012-148392 A | 8/2012 | | |
| JP | 2015-123507 A | 7/2015 | | |
| WO | 2005/118231 A1 | 12/2005 | | |
| WO | 2012/088975 A1 | 7/2012 | | |
| WO | WO-2019011799 A1 * | 1/2019 | | F16F 1/12 |

OTHER PUBLICATIONS

Chinese Office Action dated Jul. 20, 2020, in connection with corresponding CN Application No. 201910318767.1 (13 pp., including machine-generated English translation).

German Office Action dated May 12, 2021, in connection with corresponding DE Application No. 10 2019 205 560.5 (11pp., including machine-generated English translation).

* cited by examiner

ROBOT GRAVITY BALANCER AND ROBOT

CROSS-REFERENCE TO RELATED APPLICATIONS

This application is based on Japanese Patent Application No. 2018-082895, the content of which is incorporated herein by reference.

FIELD

The present invention relates to a robot gravity balancer and a robot.

BACKGROUND

A gravity balancer that is employed in a vertical articulated robot and reduces a load moment resulting from gravity by using the force of a spring or compressed air is known (for example, see Japanese Patent No. 4281195). According to whether a robot including the gravity balancer described in Patent Literature 1 is in a floor-mounted position or a ceiling-hung position, a load moment on the robot resulting from gravity acts in opposite directions. Therefore, the positional relation between a spring housed inside the gravity balancer and a rod on which the force of the spring acts is changed, to thereby switch the gravity balancer between when using the spring as a compression spring and when using the spring as a tension spring according to the position of the robot.

SUMMARY

A first aspect of the present invention is directed to a robot gravity balancer includes: a tubular housing of which both ends in the direction of a longitudinal axis are closed by end plates having through-holes; a movable member housed inside the housing so as to be movable in the direction of the longitudinal axis; a compression spring disposed between the movable member and one of the end plates; and an elongated rod that is capable of being passed through the through-holes of both of the end plates, and that is disposed in a state of having one end detachably mounted on the movable member and the other end protruding to the outside of the housing, regardless of which of the through-holes the rod is passed through. This robot gravity balancer is disposed between a first member and a second member of a robot, the second member being provided so as to be swingable around a predetermined swing axis relative to the first member.

Another aspect of the present invention is directed to a robot including the above-described robot gravity balancer.

According to this aspect, the direction of a force exerted by the other end of the rod on the first member or the second member can be easily changed, and thus the robot gravity balancer can be easily adapted to both of the floor-mounted position and the ceiling-hung position of the robot.

DETAILED DESCRIPTION

Robots 100, 110 and a robot gravity balancer 50 according to an embodiment of the present invention will be described below with reference to the drawings.

Figure 1:
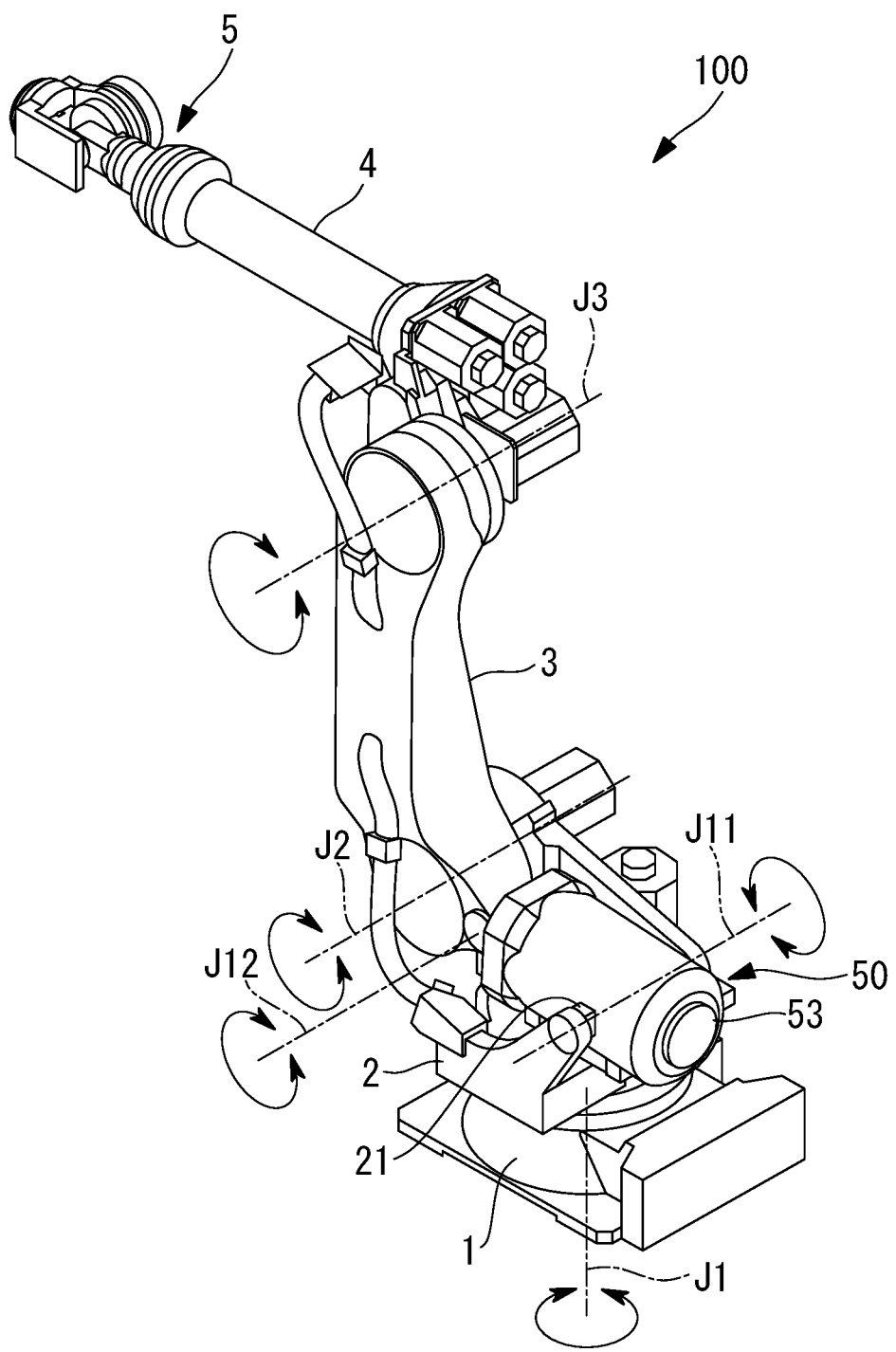
FIG. 1 is a schematic perspective view of a robot and a robot gravity balancer according to an embodiment of the present invention.

FIG. 1 is a perspective view of the floor-mounted robot 100 and the robot gravity balancer (hereinafter referred to simply as the balancer) 50 according to the embodiment. The robot 100 according to the embodiment is a vertical articulated robot having six joints. While the robot 100 is used here as a floor-mounted robot that is fixed to a floor surface, the robot 100 is also used as a ceiling-hung robot 110, to be described later, that is used by being hung from a ceiling.

The robot 100 includes: a base 1 fixed to the floor surface; a swivel body (first member) 2 supported so as to be rotatable around a vertical first axis J1 relative to the base 1; a first arm (second member) 3 supported so as to be rotatable around a horizontal second axis (swing axis) J2 relative to the swivel body 2; a second arm 4 supported so as to be rotatable around a horizontal third axis J3 relative to the first arm 3; a three-axis wrist unit 5 mounted at a leading end of the second arm 4; and the balancer 50 connected to the swivel body 2 and the first arm 3.

Figure 2:
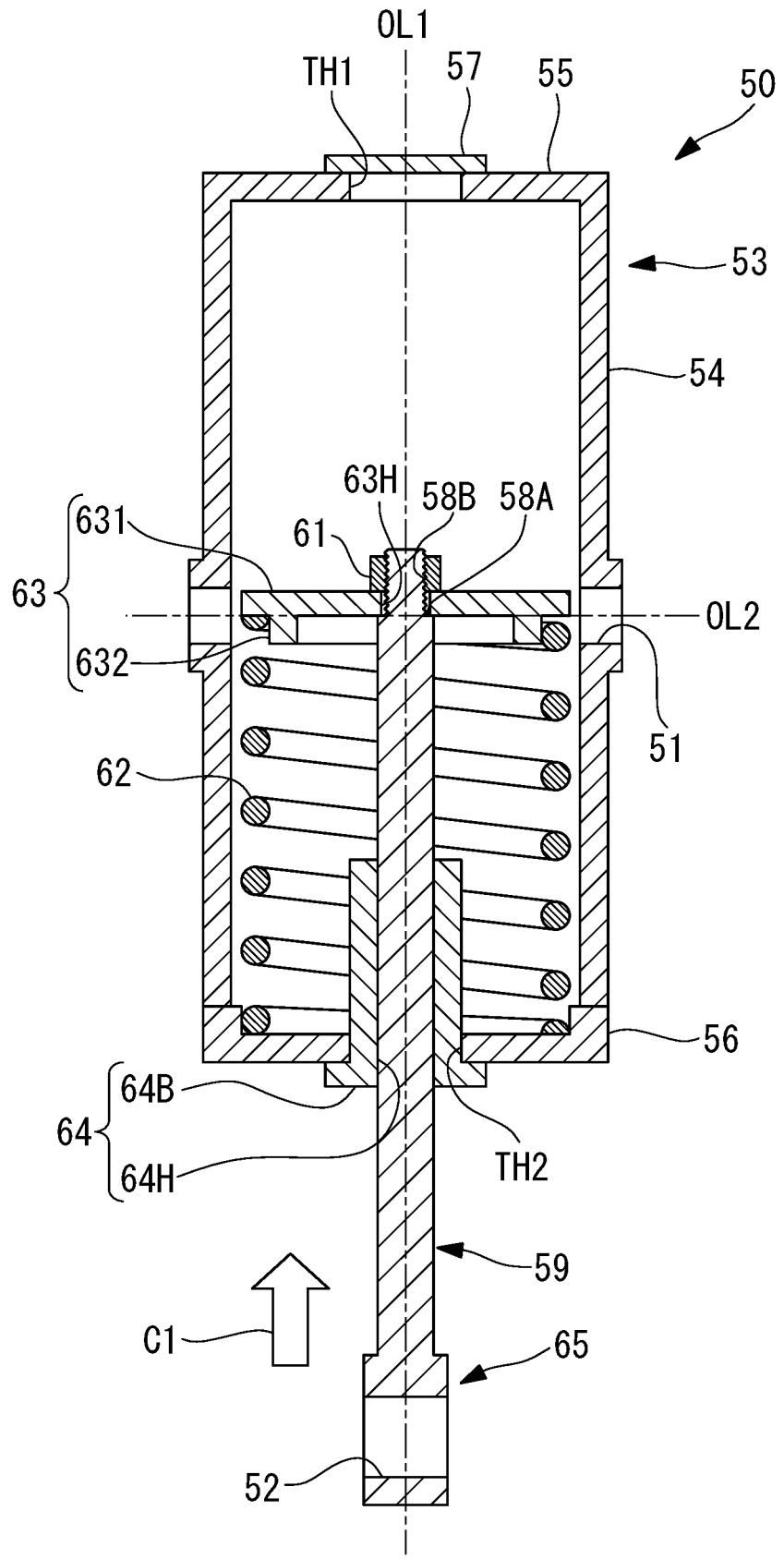
FIG. 2 is a schematic sectional view of the robot gravity balancer shown in FIG. 1.

As shown in FIG. 2, the balancer 50 includes: a cylindrical housing 53 having a longitudinal axis OL1 as a central axis; a disc-shaped movable member 63 housed inside the housing 53 so as to be movable in the direction of the longitudinal axis OL1; an elongated rod 59; and a compression coil spring 62 (compression spring).

The housing 53 includes a cylindrical main body 54 extending along the longitudinal axis OL1, and end plates 55, 56 that respectively close both ends of the main body 54 in the longitudinal direction. The main body 54 has first fulcrum holes 51 extending along an orthogonal axis OL2 orthogonal to the longitudinal axis OL1, respectively at both sides in a diametrical direction, at intermediate positions, for example, center positions in the direction of the longitudinal axis OL1.

The end plates 55, 56 respectively have through-holes TH1, TH2 of the same opening diameter that extend through the end plates 55, 56 at the center thereof along the longitudinal axis OL1. The through-hole TH1 of the end plate 55 is closed from outside by a cover 57 that is detachably mounted to the end plate 55.

The movable member 63 has an outside diameter larger than the outside diameter of the compression coil spring 62. The movable member 63 has a projection 632 that fits inside the compression coil spring 62 and protrudes from one side in a plate thickness direction of a flat plate portion 631. The movable member 63 has, at a center position, a mounting hole 63H extending through the movable member 63 in the plate thickness direction.

One end of the rod 59 that is passed through the through-hole TH2 of the end plate 56 and disposed inside the housing 53 is mounted on the movable member 63, while the other end of the rod 59 is disposed outside the housing 53. A mounting block 65 is provided at the other end of the rod 59 protruding to the outside of the housing 53. The mounting block 65 has a second fulcrum hole 52 extending in a direction orthogonal to the longitudinal axis OL1 of the rod 59.

One end of the rod 59 disposed inside the housing 53 has an external thread 58B that is provided at a leading end and a step 58A that is provided on a base end side of and adjacent to the external thread 58B. The step 58A has a larger outside diameter than the mounting hole 63H. As a nut 61 is fastened to the external thread 58B passed through the mounting hole 63H of the movable member 63, the one end of the rod 59 is fixed to the movable member 63 in a state where the movable member 63 is held between the nut 61 and the step 58A in the plate thickness direction. Thus, the external thread 58B, the step 58A, and the nut 61 constitute a mounting mechanism.

The balancer 50 includes a rod support 64 that is fitted in the through-hole TH2 and mounted to the end plate 56. The rod support 64 is formed in the shape of a cylinder having an inner hole 64H in which the rod 59 is fitted so as to be movable in the direction of the longitudinal axis OL1, and the rod support 64 is fixed to the end plate 56 by a collar 64B that extends radially outward from one end of the rod support 64.

The compression coil spring 62 is housed inside the housing 53 in a state of being held between the movable member 63 and the end plate 56. Thus, the movable member 63 is pressed by the elastic restoring force of the compression coil spring 62 toward the end plate 55 along the longitudinal axis OL1. Accordingly, the rod 59 is urged in the direction of an arrow C1 in which the rod 59 is drawn into the housing 53.

Figure 3:
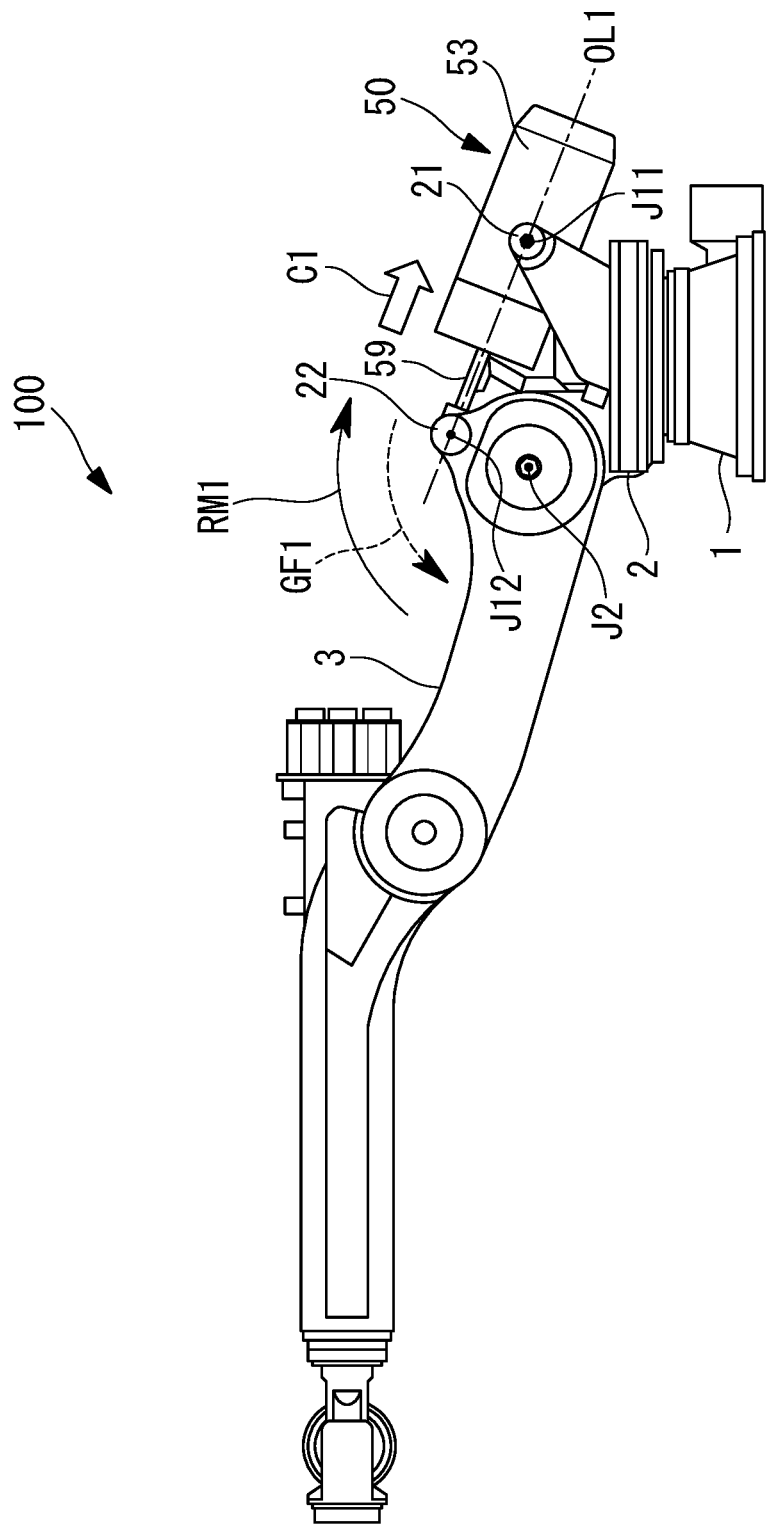
FIG. 3 is a schematic side view of the robot and the robot gravity balancer shown in FIG. 1.

As a first support shaft 21 is inserted through the first fulcrum holes 51 of the housing 53, the balancer 50 is mounted to the swivel body 2 so as to be swingable around a horizontal first support axis (first axis) J11 as shown in FIG. 3. Moreover, as a second support shaft 22 is inserted through the second fulcrum hole 52 of the mounting block 65, the balancer 50 is mounted to the first arm 3 so as to be swingable around a horizontal second support axis (second axis) J12 as shown in FIG. 3.

The second support axis J12 is disposed eccentrically relative to the second axis J2. Therefore, according to the swing angle of the first arm 3 relative to the swivel body 2, the balancer 50 swings the housing 53 around the first support axis J11 and thereby changes the length of the rod 59 protruding from the housing 53.

As shown in FIG. 3, a load moment acting in a direction GF1 around the second axis J2 is generated on the first arm 3 due to the weight of the first arm 3 itself etc. On the other hand, a rotational moment acting in a direction RM1 around the second axis J2 is generated by the balancer 50 used in the robot 100. Since the direction RM1 is opposite to the direction GF1, the load moment resulting from gravity is offset by the rotational moment generated by the balancer 50, so that the torque of a motor for rotating the first arm 3 around the second axis J2 can be kept low.

Figure 4:
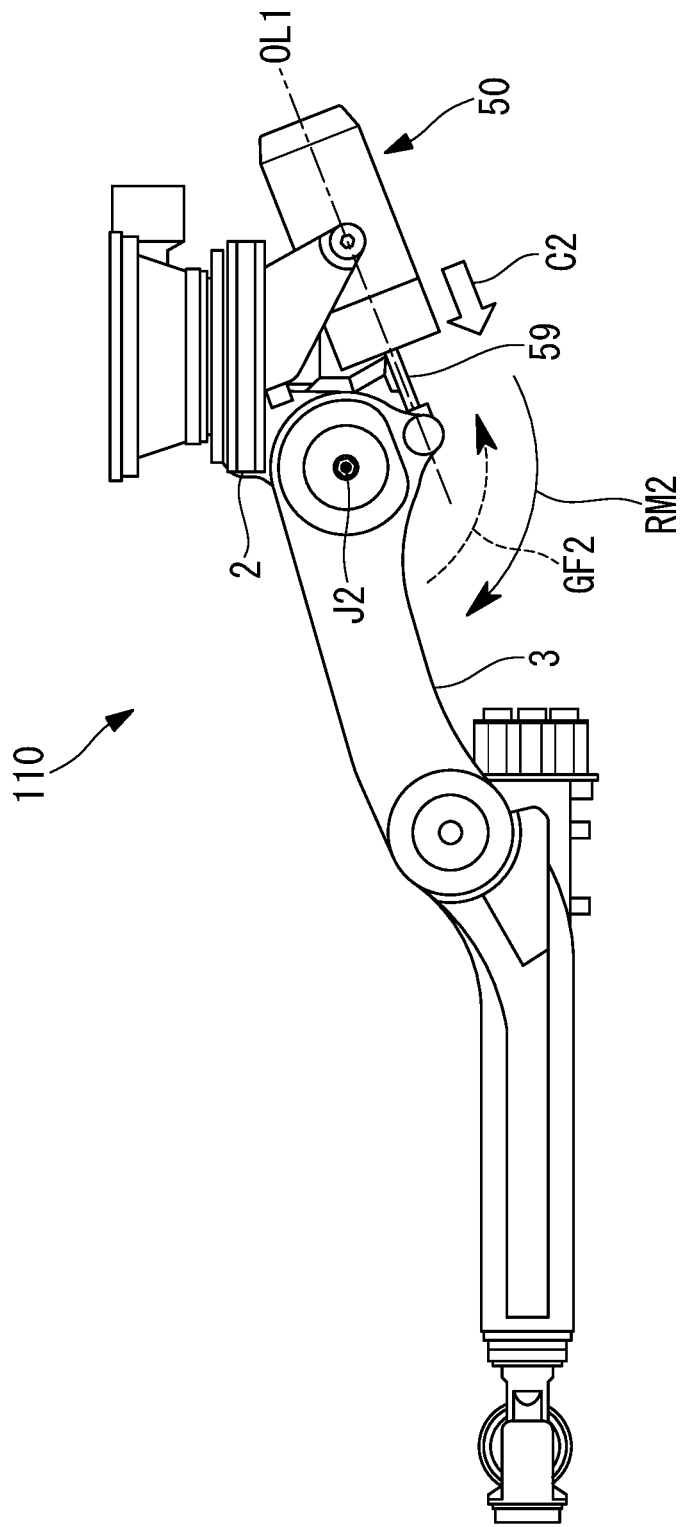
FIG. 4 is a schematic side view of the robot and the robot gravity balancer used in a ceiling-hung position.

Next, a case where the floor-mounted robot 100 is used as the ceiling-hung robot 110 will be described. In this case, as shown in FIG. 4, a direction GF2 of a load moment around the second axis J2 resulting from gravity is reversed from that in the case of the floor-mounted robot 100, so that the balancer 50 needs to generate a rotational moment in a direction RM2 around the second axis J2. To do so, the balancer 50 needs to generate an urging force by the compression coil spring 62 in a direction in which the rod 59 is pushed out of the housing 53 (the direction of an arrow C2).

Figure 5:
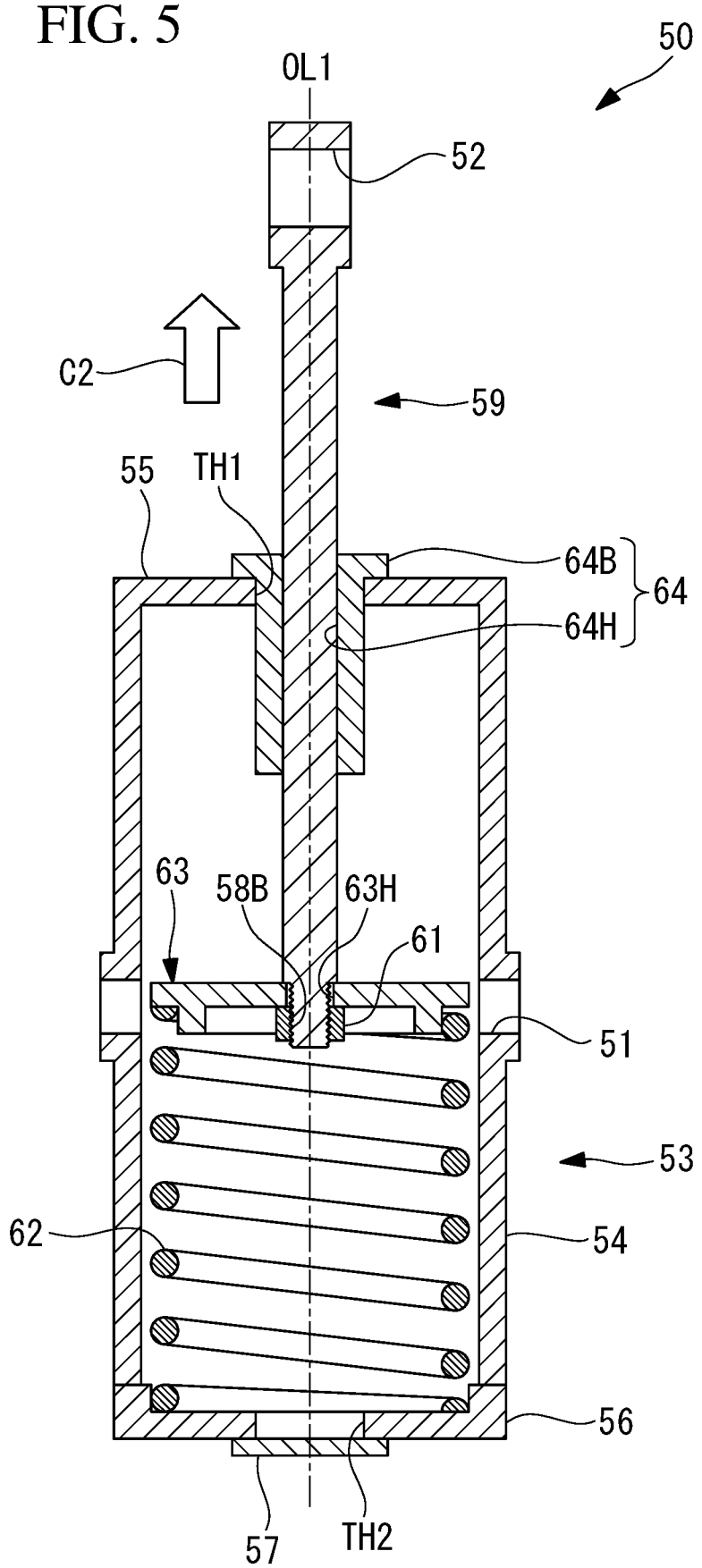
FIG. 5 is a schematic sectional view of the robot gravity balancer with the position of a rod changed.

As shown in FIG. 5, the balancer 50 for ceiling-hung application has the rod 59 and the rod support 64 disposed at positions at which the rod 59 and the rod support 64 are passed through the through-hole TH1 of the end plate 55. The cover 57 is mounted at a position at which the cover 57 closes the through-hole TH2 of the end plate 56 from outside.

To change the floor-mounted robot 100 into the ceiling-hung robot 110, the balancer 50 is removed from the robot 100 in a state where the posture of the floor-mounted robot 100 shown in FIG. 1 and FIG. 3 is set to a posture in which the urging force generated on the balancer 50 is minimized. Next, the cover 57 closing the through-hole TH1 of the end plate 55 is removed, and the nut 61 is removed from the external thread 58B through the through-hole TH1. Next, the rod support 64 is removed from the housing 53, and is pulled out along with the rod 59 through the through-hole TH2 of the end plate 56.

As shown in FIG. 5, the removed rod 59 and rod support 64 are inserted through the through-hole TH1 of the end plate 55 to mount the rod support on the end plate 55, and then the external thread of the rod 59 is passed through the mounting hole 63H and the nut 61 is fastened to the external thread to mount the rod 59 to the movable member 63. In this case, if a clearance of a dimension large enough to house the rod support 64 is not left between the movable member 63 and the end plate 55, a temporary fixing mechanism to be described later is used to secure the clearance before mounting the rod support 64. The removed cover 57 is mounted to the end plate 56 to close the through-hole TH2.

Through these work steps, the balancer 50 for floor-mounted application can be changed into the balancer 50 for ceiling-hung application.

Then, the first arm 3 of the robot 100 is moved to a position in which the first arm 3 is swung farthest forward as shown in FIG. 3, and the balancer 50 is mounted between the swivel body 2 and the first arm 3. Thus, the ceiling-hung robot 110 is realized.

The effects of the robots 100, 110 and the balancer 50 according to the embodiment will be described below.

Changing the balancer 50 according to the embodiment between floor-mounted application and ceiling-hung application requires simply removing the rod 59 and the rod support 64 from the housing 53 and changing the positions of the rod 59 and the rod support 64. Thus, it is not necessary to take out the compression coil spring 62 and the movable member 63 from the housing 53. This means that it is not necessary to disassemble and reassemble the balancer 50, which has an advantage in that the form of the balancer 50 can be easily changed between floor-mounted application and ceiling-hung application.

The rod support 64 disposed between an outer circumferential surface of the rod 59 and an inner circumferential surface of the through-hole TH1 or the through-hole TH2 can support the smooth movement of the rod 59 along the longitudinal axis OL1. Moreover, since the outside diameter of the rod support 64 passed through the through-hole TH1 or the through-hole TH2 is larger than the outside diameter of the rod 59, a large through-hole TH1 or TH2 can be provided, which can facilitate the work of attaching and detaching the rod 59 to and from the movable member 63.

Figure 6:
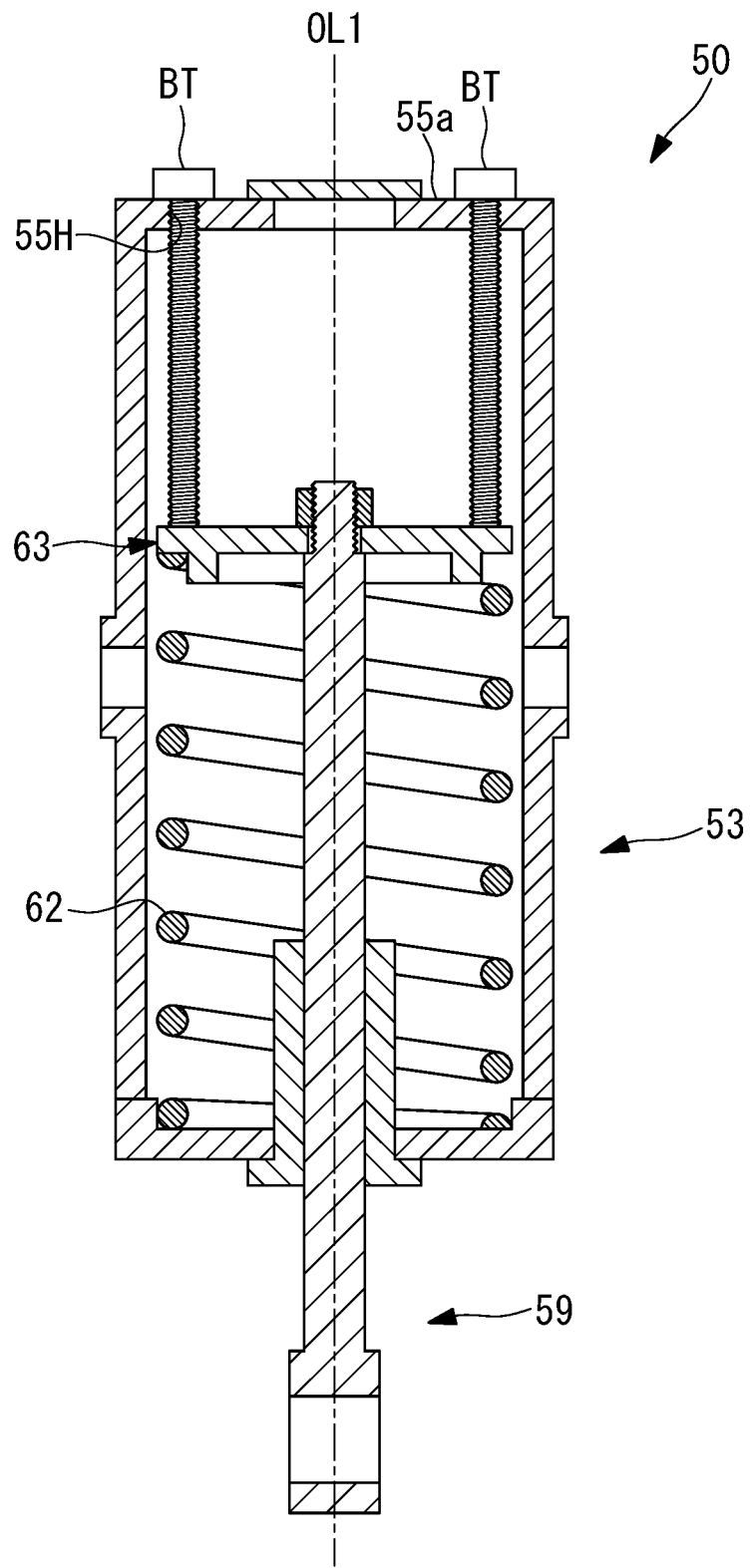
FIG. 6 is a schematic sectional view of the robot gravity balancer in a state where a movable member is fixed.

Removing the balancer 50 from the robot 100 has been described above as involving moving the robot 100 to the posture in which the urging force on the balancer 50 is minimized. Alternatively, the temporary fixing mechanism shown in FIG. 6 may be used. In the example shown in FIG. 6, the temporary fixing mechanism is composed of screw holes 55H extending through an end plate 55a in a thickness direction, and bolts BT having external threads fastened to the screw holes 55H. Specifically, the bolts BT are fastened to the screw holes 55H so as to bring leading ends of the bolts BT into contact with the movable member 63. Thus, regardless of the state of the compression coil spring 62, the movable member 63 can be temporarily fixed at that position so as not to move.

By using the temporary fixing mechanism, it is possible to easily remove the balancer 50 regardless of the posture of the robot 100 or 110. Moreover, in this case, the balancer 50 of which the form has been switched between floor-mounted application and ceiling-hung application can be mounted as is to the robot 100 or 110, and thus the conversion work can be facilitated, if the balancer 50 is removed with the movable member 63 temporarily fixed by the temporary fixing mechanism, after the posture of the robot 100 or 110 is fixed at such a position that the distance between the first fulcrum holes 51 and the second fulcrum hole 52 remains the same when the form of the balancer 50 is switched.

Figure 7:
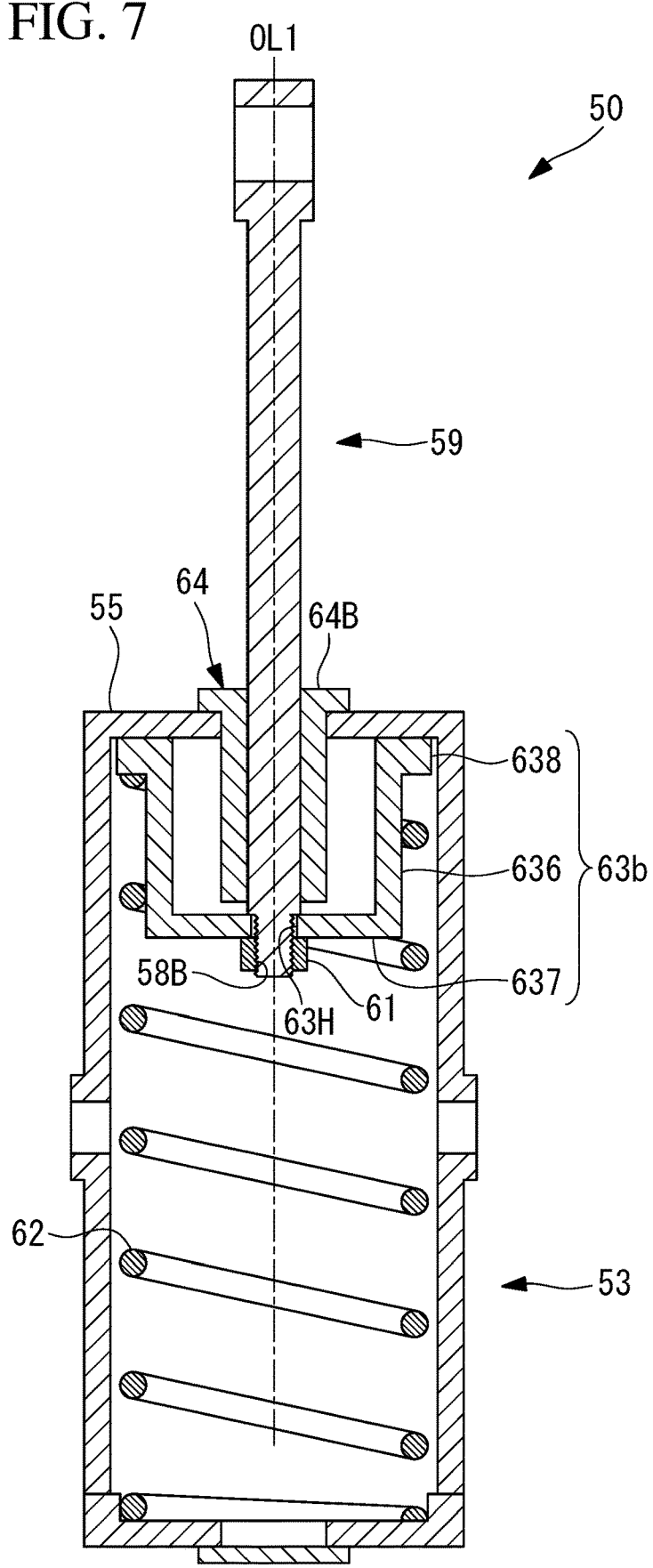
FIG. 7 is a schematic sectional view of a modified example of the robot gravity balancer shown in FIG. 1.

The rod support 64 has been described above as being mounted in the state where the clearance between the movable member 63 and the end plate 55 has been increased by the temporary fixing mechanism so as to be able to house the rod support 64. Alternatively, a movable member 63b having an elaborate shape as shown in FIG. 7 can be used to eliminate the need for using the temporary fixing mechanism. Specifically, the movable member 63b includes: a cylindrical part 636; a collar-shaped flange 638 that extends radially outward at one end of the cylindrical part 636 and is brought into close contact with one end of the compression coil spring 62; and a mounting surface 637 which is disposed at the other end of the cylindrical part 636 and to which one end of the rod 59 can be mounted. The cylindrical part 636 has an outside diameter smaller than the inside diameter of the compression coil spring 62 and an inside diameter that allows the rod support 64 to be inserted into the cylindrical part 636.

If the movable member 63b is used, the clearance between the end plate 55 and the mounting surface 637 to which the one end of the rod 59 is mounted can be secured even when the compression coil spring 62 is expanded to a maximum dimension, and this clearance can be used to mount the rod support 64.

The robots 100, 110 and the balancer 50 in the above embodiment are merely examples, and various modifications can be made to the shapes and configurations thereof. For example, the robots 100, 110 can be applied to any robots in which the direction of gravity acting on the axis of gravity changes as the installation form changes from one to another of floor mounting, ceiling hanging, wall hanging, etc.

The place to dispose the balancer 50 is not limited to between the first arm 3 and the swivel body 2 that is swingable around the second axis J2, but may instead be, for example, between the second arm 4 and the first arm 3 that is swingable around the third axis J3.

The housing 53 has a cylindrical shape in the above embodiment. However, the housing 53 may have any shape, for example, a tubular shape with a rectangular cross-section, as long as the housing 53 can house the movable member 63 and the compression coil spring 62. As long as the rod 59 has one end mounted on the movable member 63 and the other end protruding to the outside of the housing 53, the method of mounting the one end of the rod 59 to the movable member 63 and the method of mounting the other end of the rod 59 to the robots 100, 110 can be changed. For example, a method of mounting the rod 59 to the movable member 63 may be adopted in which an internal thread to which the external thread 58B can be fastened is provided in the mounting hole 63H and the nut 61 is fastened to the external thread 58B passed through the internal thread so as to form a double nut.

In the above embodiment, the first fulcrum holes 51 are provided in the housing 53 and the balancer 50 is swingably mounted to the swivel body through the first support shaft 21. Alternatively, a support shaft may be provided on the side of the housing 53.

As a result, the above-described embodiment leads to the following aspects.

A first aspect of the present invention is directed to a robot gravity balancer includes: a tubular housing of which both ends in the direction of a longitudinal axis are closed by end plates having through-holes; a movable member housed inside the housing so as to be movable in the direction of the longitudinal axis; a compression spring disposed between the movable member and one of the end plates; and an elongated rod that is capable of being passed through the through-holes of both of the end plates, and that is disposed in a state of having one end detachably mounted on the movable member and the other end protruding to the outside of the housing, regardless of which of the through-holes the rod is passed through. This robot gravity balancer is disposed between a first member and a second member of a robot, the second member being provided so as to be swingable around a predetermined swing axis relative to the first member.

The robot gravity balancer of this aspect is used in a state where the other end of the rod protruding to the outside of the housing is mounted on one of the first member and the second member of the robot and the housing is mounted on the other one of the first member and the second member. By using the elastic restoring force of the compression spring, the robot gravity balancer generates a rotational moment that causes the second member to rotate around the swing axis relative to the first member. The robot gravity balancer can reduce a load moment resulting from gravity and acting around the swing axis by being disposed in such a state that the direction of the aforementioned rotational moment is opposite to the direction of this load moment around the swing axis.

According to this aspect, when the rod is passed through the through-hole of the end plate on the compression spring side with respect to the movable member, the rod is subjected to a force acting in a direction in which the rod is drawn into the housing. Conversely, when the rod is passed through the through-hole of the other end plate, the rod is subjected to a force acting in a direction in which the rod is pushed out of the housing. It is therefore possible to easily switch the direction of a force generated by the robot gravity balancer, by removing the rod from the movable member and pulling out the rod to the outside of the housing through the one through-hole and then inserting the rod through the other through-hole and mounting the rod to the movable member. Thus, the work of switching the direction of the force does not require taking out the compression spring and the movable member from the housing.

In the above aspect, the robot gravity balancer may further include a mounting mechanism by which the one end of the rod is detachably mounted to the movable member. The mounting mechanism may include: an external thread provided at the one end of the rod; a step disposed on a base end side of the external thread; a mounting hole which is provided in the movable member and through which the external thread is passed; and a nut that is fastened to the external thread to hold the movable member between the nut and the step.

This configuration allows the rod to be attached to and detached from the movable member by a simple mounting mechanism, so that the direction of a force generated by the robot gravity balancer can be changed more easily.

In the above aspect, the robot gravity balancer may further include a tubular rod support that is detachably mounted in the through-hole through which the rod is passed, and that supports the rod so as to be movable in the direction of the longitudinal axis.

This configuration makes it possible to support the smooth movement of the rod in the direction of the longitudinal axis by the rod support. Since the outside diameter of the rod support is larger than the outside diameter of the rod, a large through-hole can be provided in the end plate, which can facilitate the work of attaching and detaching the rod to and from the movable member.

In the above aspect, the movable member may include: a cylindrical part having an outside diameter smaller than the inside diameter of the compression spring and an inside diameter that allows the rod support to be inserted into the cylindrical part; a collar-shaped flange that extends radially outward at one end of the cylindrical part and is brought into close contact with one end of the compression spring; and a mounting surface which is disposed at the other end of the cylindrical part and to which the one end of the rod is detachably attached.

This configuration makes it possible to insert the cylindrical part into the compression spring and dispose the mounting surface at an intermediate position of the compression spring in the direction of the longitudinal axis. Thus, even in a state where the compression spring is expanded to a maximum extent, a space to house the rod support can be provided inside the cylindrical part of the movable member, which can facilitate attaching and detaching the rod support to and from the housing.

In the above aspect, the robot gravity balancer may further include a temporary fixing mechanism by which the position of the movable member along the longitudinal axis is temporarily fixed in a state where the compression spring is compressed.

This configuration makes it possible to keep the movable member from moving by the temporary fixing mechanism, which can facilitate attaching and detaching the rod to and from the movable member.

In the above aspect, the housing may include a first fulcrum portion at which the robot gravity balancer is mounted to one of the first member and the second member so as to be swingable around a first axis parallel to the swing axis. The rod may include, at the other end of the rod, a second fulcrum portion at which the robot gravity balancer is mounted to the other one of the first member and the second member so as to be swingable around a second axis parallel to the swing axis.

This configuration allows the robot gravity balancer to swing around the first axis and change its posture as the second member swings around the swing axis relative to the first member. Thus, a rotational moment can be generated around the swing axis by the compression spring, regardless of the posture of the second member relative to the first member.

Another aspect of the present invention is directed to a robot including the above-described robot gravity balancer.

According to this aspect, the direction of a force exerted by the other end of the rod on the first member or the second member can be easily changed, and thus the robot gravity balancer can be easily adapted to both of the floor-mounted position and the ceiling-hung position of the robot.

The present invention offers an advantage in that the robot gravity balancer can be used for robots of both floor-mounted and ceiling-hung types and allows the direction of a force it generates to be easily changed.

REFERENCE SIGNS LIST

2 Swivel body (first member)
3 First arm (second member)
50 Robot gravity balancer
51 First fulcrum hole
52 Second fulcrum hole
63 Housing
55, 55a, 56 End plate
55H Screw hole (temporary fixing mechanism)
58A Step
58B External thread
59 Rod
61 Nut
62 Compression coil spring (compression spring)
63, 63b Movable member
63H Mounting hole
64 Rod support
636 Cylindrical part
637 Mounting surface
638 Flange
100, 110 Robot
J2 Second axis (swing axis)
J11 First support axis (first axis)
J12 Second support axis (second axis)
OL1 Longitudinal axis
TH1, TH2 Through-hole

The invention claimed is:
1. A robot gravity balancer comprising:
a tubular housing of which both ends in a direction of a longitudinal axis are closed by end plates having through-holes, wherein each of the end plates has at least one of the through-holes;
a movable member housed inside the housing so as to be movable in the direction of the longitudinal axis;
a compression spring disposed between the movable member and one of the end plates;
an elongated rod that is capable of being passed through the through-holes of both of the end plates, and that is disposed in a state of having one end detachably mounted on the movable member and the other end protruding to an outside of the housing, regardless of which of the through-holes the rod is passed through; and
a tubular rod support that is detachably mounted in the through-hole through which the elongated rod is passed, and that supports the elongated rod so that the elongated rod is movable along the tubular rod support in the direction of the longitudinal axis,
wherein both of the through-holes of the end plates are capable of being assembled with the tubular rod support,
wherein the robot gravity balancer is disposed between a first member and a second member of a robot, the second member being provided so as to be swingable around a predetermined swing axis relative to the first member.

2. The robot gravity balancer according to claim 1, further comprising a mounting mechanism by which one end of the rod is detachably mounted to the movable member, wherein the mounting mechanism includes: an external thread provided at the one end of the rod; a step disposed on a base end side of the external thread; a mounting hole which is provided in the movable member and through which the external thread is passed; and a nut that is fastened to the external thread to hold the movable member between the nut and the step.

3. The robot gravity balancer according to claim 1, wherein:
the housing includes a first fulcrum portion at which the robot gravity balancer is mounted to one of the first member and the second member so as to be swingable around a first axis parallel to the swing axis; and
the rod includes, at an end of the rod, a second fulcrum portion at which the robot gravity balancer is mounted to the other one of the first member and the second member so as to be swingable around a second axis parallel to the swing axis.

4. A robot comprising the robot gravity balancer according to claim 1.

5. The robot gravity balancer according to claim 1,
wherein the movable member includes a cylindrical part having an outside diameter smaller than an inside diameter of the compression spring and an inside diameter that allows the rod support to be inserted into the cylindrical part, and
wherein the movable member has a protruded shape with the cylindrical part, such that the cylindrical part of the movable member accommodates the tubular rod support in a state where the compression spring is uncompressed, and the cylindrical part of the movable member accommodates the tubular rod support, such that the tubular rod support is inserted into the cylindrical part of the movable member.

6. The robot gravity balancer according to claim 5, wherein the movable member further includes: a collar-shaped flange that extends radially outward at one end of the cylindrical part and is brought into close contact with one end of the compression spring; and a mounting surface which is disposed at the other end of the cylindrical part and to which the one end of the rod is detachably attached.

* * * * *